United States Patent

Berger et al.

[15] 3,700,716

[45] Oct. 24, 1972

[54] AMINO-FUNCTIONAL SILANE COMPOUNDS

[72] Inventors: Abe Berger; Terry G. Selin, both of Schenectady, N.Y.

[73] Assignee: General Electric Company

[22] Filed: Aug. 12, 1971

[21] Appl. No.: 171,337

[52] U.S. Cl...............260/448.2 N, 210/54, 252/357, 260/239 E, 260/448.2 B, 260/448.2 E, 260/448.8 R
[51] Int. Cl...............................C07f 7/10, C07f 7/18
[58] Field of Search...260/448.2 N, 448.8 R, 448.2 E

[56] References Cited

UNITED STATES PATENTS

| | | | |
|---|---|---|---|
| 3,208,971 | 9/1965 | Gilkey et al. | 260/448.8 R X |
| 3,440,261 | 4/1969 | Saam | 260/448.2 N |
| 3,597,457 | 8/1971 | Robinson et al. | 260/448.8 R X |
| 3,598,852 | 8/1971 | Berger | 260/448.2 E |

Primary Examiner—Tobias E. Levow
Assistant Examiner—P. F. Shaver
Attorney—Donald J. Voss et al.

[57] ABSTRACT

A silicone compound of the formula,

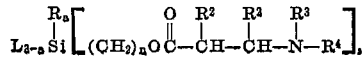

where L is selected from secondary amine groups and $R^1O$ groups, $R^1$ and $R^2$ are selected from hydrocarbon groups and $R^3$ and $R^4$ are selected from hydrogen, hydrocarbon groups and other amine groups. Further, $n$ is a whole number that varies from 1 to 20 and $a$ is a whole number that varies from 0 to 2. These amino-functional silane compounds may be used as sewage flocculents.

7 Claims, No Drawings

AMINO-FUNCTIONAL SILANE COMPOUNDS

BACKGROUND OF THE INVENTION

The present invention relates to silicone compounds and, in particular, the present invention relates to silicone compounds having an amine-functional group thereon and further, where the compound is produced from an acrylate intermediate.

Flocculating agents for precipitating colloidal particles from various types of suspensions are well known in the art. In particular, at the present time there has been a great deal of research carried out in the development of waste water treatment and particularly organic or sewage waste water treatment. During this treatment, organic waste matter in the form of colloidal particles become suspended in the waste water system and during the processing of this waste water it becomes necessary to flocculate and precipitate the organic colloidal particles. It has been found that some of the more efficient flocculating agents for precipitating such colloidal organic matter from waste water are the cationic polyelectrolytes. It is, of course, appreciated that the efficiency of the various cationic polyelectrolytes vary and thus there is a constant search for more efficient cationic electrolytes for flocculating organic colloidal matter.

It has been noticed that a combination of a silica sol with certain silanes will produce a very efficient flocculating agent for organic colloidal matter. In this respect, there is constant research and development of silanes and silicone compounds that will co-react with silica sol and other systems, as well as operate by themselves as efficient flocculating agents for organic colloidal matter.

In addition, bonding agents and, in particular, bonding agents for different types of resins and plastics to glass, glass fibers and other such types of glass materials are constantly being sought after. In particular, since glass fibers are so widely used for the production of various articles, there is a constant search for the development of better bonding agents for bonding olefinically functional plastics and resins to glass fibers. To produce such a bonding agent, it is necessary that the compound have a group that will be reactive with the glass fibers, silica and other types of glass and also have a reactive group that will be reactive with the plastic resin. The more reactive the group on the bonding compound is towards the plastic resin, the firmer and stronger the bond that will be formed by the bonding agent.

Thus, it is one object of the present invention to provide a new class of silicone compounds.

It is another object of the present invention to provide a novel process for producing a novel class of silicone compounds.

It is yet another object of the present invention to provide a novel flocculating agent for organic colloidal matter.

It is still another object of the present invention to provide a novel class of silicone compounds for bonding various resins to glass fibers and other types of silica material.

These and other objects of the present invention are accomplished by means of the invention defined below.

SUMMARY OF THE INVENTION

In accordance with the present invention, there is provided a silicone compound of the formula, (1) 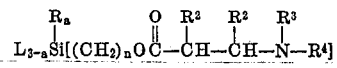

where L is selected from the group consisting of $R'_2N$— and $R'O$—, R and $R^1$ are selected from the class consisting of monovalent hydrocarbon radicals and monovalent halogenated hydrocarbon radicals, $R^2$ is selected from the class consisting of alkyl, hydrogen and aryl radicals of up to 10 carbon atoms, $R^3$ and $R^4$ are independently selected from the class consisting of hydrogen, aryl radicals, alkyl radicals, $$-R^5-\overset{R^3}{\underset{|}{N}}-R^4, \ -R^5-OH, \ -R^5\overset{O}{\underset{\|}{C}}OR^1, \ -R^5SR^1, \ -R^5\overset{O}{\underset{\|}{C}}R^1, \ -R^5CN$$

$R^5OR^1$, where $R^5$ is a divalent hydrocarbon radical selected from the class consisting of alkylene and arylene radicals of up to 10 carbon atoms, $n$ is a whole number that varies from 1 to 20 and $a$ is a whole number that varies from 0 to 2.

In the formula, preferably R, $R^1$ and $R^2$ are methyl and $n$ is equal to 3. Further, preferably $a$ is equal to 0.

DETAILED DESCRIPTION OF THE PREFERRED EMBODIMENT

In formula (1), the radicals R and $R^1$ may be, for example, alkyl radicals, e.g., methyl, ethyl, propyl, butyl, octyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, cyclohexenyl, etc. radicals; cycloalkyl radicals, e.g., cyclohexyl, cycloheptyl, etc. radicals; halogen-substituted monovalent hydrocarbon radicals such as, for example, chloromethyl, chloroethyl, dibromophenyl, etc. radicals, and other such types of radicals. Preferably, the radicals R and $R^1$ have no more than 10 carbon atoms and, more preferably, have no more than six carbon atoms. Preferably, R is methyl and $R^1$ is methyl or ethyl. As stated previously, $a$ is a whole number that varies from 0 to 2, but is more preferably 0. The symbol $n$ is a whole number that varies from 1 to 20 and is preferably 1 to 10, such as methylene, ethylene, trimethylene, etc. The radicals $R^2$ are independently selected, that is, one $R^2$ radical may be different from the other $R^2$ radical. These $R^2$ radicals are independently selected from alkyl and aryl radicals of up to 10 carbon atoms, such as methyl, ethyl, propyl, butyl, etc. The radicals $R^3$ and $R^4$ may be hydrogen, alkyl radicals, cycloalkyl radicals, aryl radicals of up to 15 carbon atoms. The radical $R^5$ is a divalent hydrocarbon radical selected from alkylene and arylene radicals of up to 10 carbon atoms, such as methylene, ethylene, phenylene, etc.

The preferred compound is that having the formula,

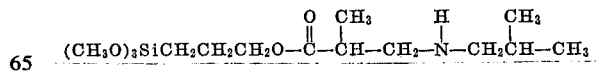

Other preferred compounds within the scope of formula (1) are as follows:

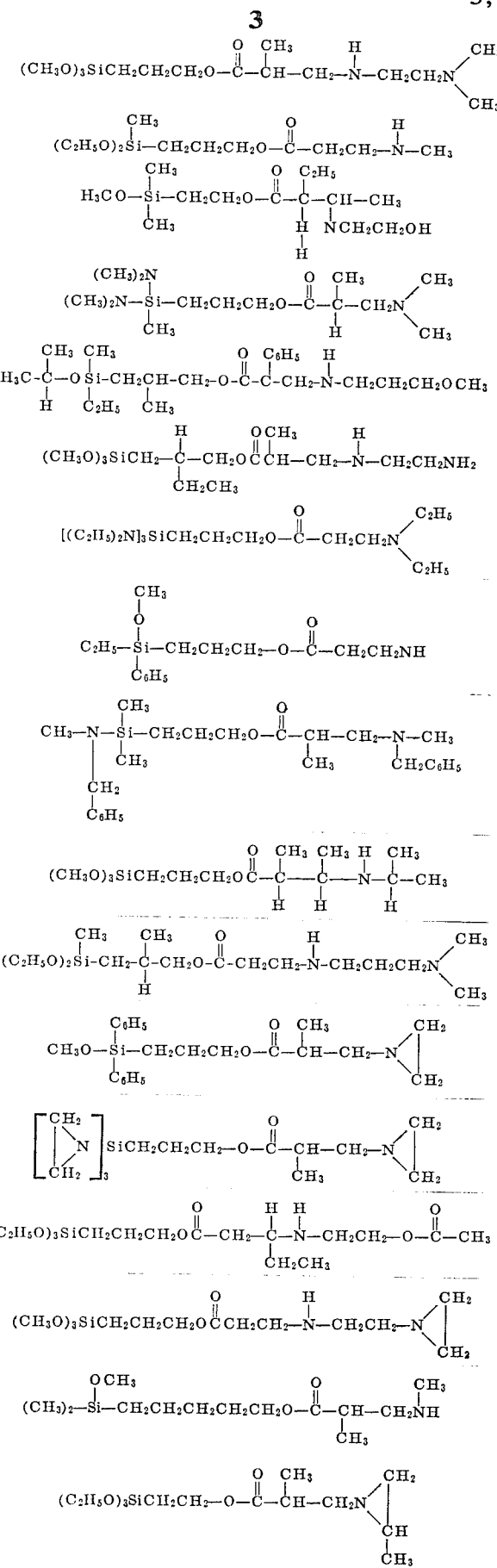

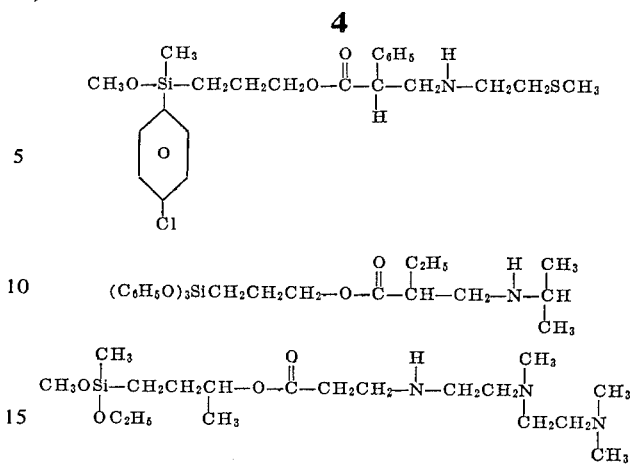

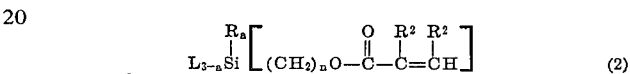

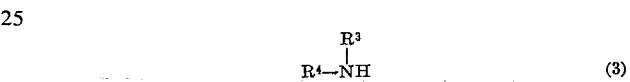

The silane of formula (1) is produced by reacting a silane having the formula, $$\underset{L_{3-a}}{R_a}Si\left[(CH_2)_nO-\overset{O}{\underset{\|}{C}}-\overset{R^2}{\underset{|}{C}}=\overset{R^2}{\underset{|}{CH}}\right] \quad (2)$$

with a compound of the formula, $$R^4-\underset{|}{\overset{R^3}{N}}H \quad (3)$$

The symbols and radicals L, R, R$^1$, R$^2$, R$^3$, R$^4$, $n$ and $a$ are as previously defined. The compounds of formula (2) and formula (3) above are preferably reacted in a stoichiometric relationship. It is not necessary that the reaction take place in the presence of a solvent. However, one of the common inert hydrocarbon solvents or ether may be used as a solvent in this reaction. Such solvents that may be used in the present reaction are, for example, xylene, toluene, benzene, mineral spirits, cyclohexane, tetrahydrofuran, diethyleneglycoldimethyl ether, etc. The reaction may also be carried out at room temperature. One difficulty with allowing the reaction to be carried out at room temperature is because of the slowness of the reaction, it requires a considerable amount of time to obtain an acceptable yield of 70 percent to 80 percent under those conditions. Thus, the reaction is preferably carried out at a temperature range of $a°$ to 120° C and, more preferably, in a temperature range of 90° to 120° C to allow the reaction to proceed to completion in the period of 3 to 24 hours. In that reaction time, it is possible to obtain a yield of 70 percent to 80 percent of the desired product of formula (1). However, if the reaction is allowed to proceed for a longer period of time, such as say 48 hours and above, it is possible to obtain a more increased yield than the 80 percent level.

Further, the reaction of the compound of formula (2) with the compound of formula (3) does not require a catalyst. However, an acid catalyst or a basic catalyst may be used to allow the reaction to proceed with the desired yield of 70 percent to 80 percent at a lower reaction time of 12 hours to 14 hours. In terms of acid catalysts, there may be used a well known Lewis acid catalyst such as, for example, ammonium chloride, boron trifluoride, acetic acid, etc. However, an acid catalyst is not preferred because there is the possibility that the acid catalyst might inter-react with the amine reactant. As such, in the present reaction it is preferable to use a basic catalyst, such as potassium hydroxide or sodium hydroxide. Other preferable basic catalysts that are more preferred in the present reaction are tertiary amines, such as tributylamine, quaternary ammonium hydroxides, sodium methoxide and other such compounds. The catalyst should be present in the reaction mixture in the concentration of 0.5 to 5 weight per cent by weight of the reaction mixture. As an upper limit, the concentration of the catalyst should be no more than 3 percent by weight of the reaction mixture. More preferably, the concentration of the basic catalyst should be 0.5 to 1.5 percent by weight of the reaction mixture. For obvious reasons, if the catalyst concentration is below 0.5 weight per cent, then such a catalyst does not have the necessary affect on the reaction. On the other hand, if the catalyst concentration is more than 5 percent by weight, then the additional catalyst is not necessary and there is the possibility that it might degrade the final reaction product of formula (1).

The compounds of formula (3) are well known in the art and are available and are being sold by such companies as Pennsalt Chemical Co., Philadelphia, Pa., and Union Carbide Corporation, New York, New York.

The compounds of formula (2) are produced by reacting a compound of the formula,

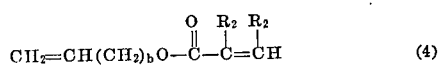 (4)

with a compound of the formula,

 (5)

where $b$ varies from 0 to 18, R and $R^2$ are the same as defined previously and Z is halogen. The reaction of the compounds of formulas (4) and (5) preferably take place in the presence of a platinum catalyst. The radical Z is formula (5) may be substituted with the radicals $R'_2N$ or $R'O$, prior to or after the reaction between the compounds of formulas (4) and (5). Preferably, this is done before the reaction of the compounds of formulas (4) and (5), to obtain a compound within the scope of formula (2). A reference which illustrates this reaction is mentioned in Eaborn "Organosilicon Compounds," Chap. 9 and 11, Butterworth Scientific Publications (1960). The disclosure of these references are hereby incorporated into this patent application by reference. Thus, the compound of formula (5) may be taken and reacted with a secondary amine of the formula $R'_2NH$ in stoichiometric relationship to obtain the desired product. In this reaction, there is used at least 100 percent in excess of the amine to remove the excess hydrogen chloride that is formed, such that the secondary amine acts as a hydrogen chloride acceptor so as to prevent the hydrogen chloride that is formed from further reacting with the silane of formula (5). Other hydrogen chloride acceptors or scavengers may be used, such as tributylamine and trimethylorthoformate. If it is desired, this reaction takes place either at room temperature or at elevated temperatures, such as 80° to 120° C in the period of 2 to 8 hours. A catalyst is not necessary in this aminization reaction.

On the other hand, if it is desired to substitute the halogen in formula (5) with an R'O group, then the silane of formula (5) is reacted in a stoichiometric proportion with an alcohol of the formula R'OH, where the symbol R' is as defined previously. In this reaction, the two reactants are merely added together and heated to a temperature above 50° C and, preferably, less than 150° C and, more preferably, in the range of 50° to 100° C, to result in the alcoholysis product. In this reaction, a catalyst is not necessary and it is not used. The alcoholysis reaction proceeds to 75 to 90 percent to completion as does the aminization reaction in the period of 4 to 8 hours. For more details as to this method, one is referred to the above-mentioned reference.

The reaction between the compounds of formulas (4) and (5) in the presence of a platinum catalyst is an SiH— platinum catalyzed olefin addition reaction. The platinum compound catalyst can be selected from that group of platinum compound catalysts which are operative to catalyze the addition of silicon-hydrogen bonds across olefinic bonds. Among the many useful catalysts for this addition reaction are chloroplatinic acid as described in U.S. Pat. No. 2,823,218 — Speier et al; the reaction product of chloroplatinic acid with either an alcohol and ether or an aldehyde as described in U.S. Pat. No. 3,220,972 — Lamoreaux; trimethylplatinum iodide and hexamethyldiplatinum as described in U.S. Pat. No. 3,313,773 — Lamoreaux; the platinum olefin complex catalyst as described in U.S. Pat. No. 3,159,601 —Ashby and the platinum cyclopropane complex catalyst described in U.S. Pat. No. 3,159,662 — Ashby.

The SiH-olefin addition reaction may be run at room temperature or temperatures up to 200° C, depending upon catalyst concentration. The catalyst concentration can vary from $10^{-7}$ to $10^{-3}$ and, preferably, $10^{-5}$ to $10^{-4}$ mole of platinum as metal to a mole of the olefinic-containing molecules present. For further information as to such a type of reaction, one is referred to Journal of American Chemical Society, Vol. 79, page 974 (1957), whose disclosure insofar as it relates to SiH—olefin addition reaction is hereby incorporated into the present disclosure by reference.

The compounds within the scope of formula (4) above are well known in the art and are sold by such companies as Sartomer Resins Company, Philadelphia, Pennsylvania, Borden Chemical Company, Philadelphia, Pa., Aldrich Chemical Company, Milwaukee, Wisconsin, Alcolac Chemical Company, Baltimore, Maryland. Quite simply, the compounds of formula (4) above are obtained by reacting an olefinic chloride of the formula,

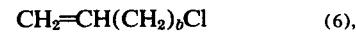 (6), with an acrylate of the formula,

 (7)

where K stands for potassium and the symbols $R^2$ and $b$ are as defined previously. The above reaction takes place preferably in an inert solvent, such as ketones, using a tertiary amine catalyst. The compounds of formulas (6) and (7) are reacted in stoichiometric proportions. This is a well known type of Williamson reaction. A catalyst such as tertiary amine is helpful in this reaction, since the reactants react most efficiently to result in the product of formula (4) in 85 to 90 percent yields in a reaction time of 2 to 12 hours. This reaction may be carried out at room temperature but is preferably carried out so as to obtain high yields in as short a period of time in the temperature range of 80° to 150° C. In the case where b is equal to 0 in the compound of formula (4), it is necessary to adopt a different method of synthesis. In that case, the reacting compounds, as well as the reaction product, may be illustrated by the following reaction:

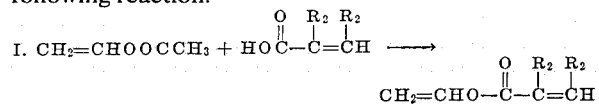

In reaction I, $R^2$ is as defined previously. With the above reaction, it is possible to obtain the product indicated in 85 percent to 90 percent yields by carring the reaction in an inert hydrocarbon solvent such as xylene, toluene, benzene, cyclohexane, etc. Preferably, the reaction conditions are such that the temperature of the reaction is maintained below 50° C to obtain the desired high yield. In this reaction, a catalyst is necessary and the preferred catalyst system is a mixture of mercuric acetate with sulfuric acid in a concentration of 0.3 to 5 percent by weight of the two reactants.

The following examples are presented below for the purpose of illustrating the present invention. They are not intended or should it be inferred that they limit the scope of the invention as claimed in any way.

EXAMPLE 1

Synthesis of a compound of the formula,

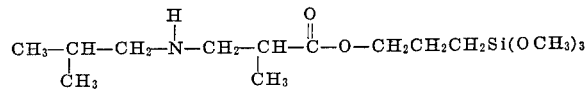

A reaction mixture containing 37 g (0.5 mole) isobutylamine and 124 g (0.5 mole) trimethoxysilylpropyl methacrylate is allowed to stir at ambient temperature for two hours. A very mild exothermic reaction is evident. The temperature rises from 29° to 33° C in this interval of time. Following this, the reaction is brought to 70° C by the application of external heat and held there for four hours. A VPC scan at this time shows indeed, an adduct is formed. Upon fractionation, a product is obtained; B.P. 114°/0.25 mm in about 55 percent conversion. But the yield is substantially higher based on recovered starting materials.

EXAMPLE 2

A reaction mixture is charged with 76 g allyl chloride, 238 g sodium methacrylate, 50 g methylethyl ketone, 5 g each of triethylamine and sodium iodide and is heated to 95°–100° C (under slight pressure) for 2 hours. The product is then isolated and purified. A mixture of 127 g (1 mole) allyl methacrylate and one-fourth mole of a 0.1M chlorolatinic acid solution in isopropanol is prepared. The reaction is heated to 80° C whereupon there is added dropwise 133 g trichlorosilane (1 mole). An exothermic reaction begins. Rate of silane addition is controlled to keep reaction pot temperature to 130° C. Upon complete silane addition, the reaction is heated to 120° C for 2 hours. Then there is distilled the product trichlorosilylpropyl methacrylate which is isolated. The purity is checked by gas chromatography and structure confirmed by infrared and nuclear magnetic resonance with a yield which is above 90 percent. Then 130 parts of the above silane is placed in a pot and 48 parts methanol is added dropwise at ambient temperature. Hydrogen chloride immediately evolves and the reaction temperature climbs slowly to about 45° C. When all the methanol is added, the pot is brought to reflux whereupon an additional 24 parts is added. The reaction is kept at reflux and samples periodically withdrawn until the chloride level is less than 5 ppm. The reaction is then fractionated to obtain pure

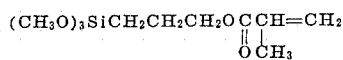

To 125 g of the above is slowly added 44 g N,N-dimethylethylenediamine. A mild exotherm is noted during the latter part of the addition. After complete addition, the reaction is heated to 90° C for 8 hours. Gas chromatography analysis indicates an adduct is present. The product is purified by fractionation and its structure is confirmed as,

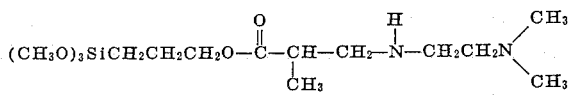

EXAMPLE 3

To 130 parts of trichlorosilylpropyl methacrylate in 1,000 parts of anhydrous tetrahydrofuran is added slowly 134 parts dimethylamine (via a gas cylinder). A very exothermic reaction occurs. An immediate precipitate of dimethylamine hydrochloride occurs. As stirring becomes difficult, additional solvent is added. After complete amine addition, the reaction is refluxed for 4 hours and filtered. To the supernatant liquid is then added 30 additional grams of dimethylamine. After refluxing for 6 hours, a gas chromatography analysis of the reaction mixture shows a high boiling adduct is produced. Distillation of the pot content results in the recovery of,

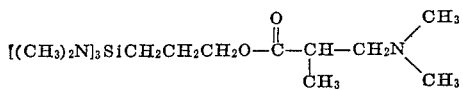

whose structure is confirmed by both infrared and nuclear magnetic resonance.

EXAMPLE 4

The addition of 43 g ethylenimine to 202 g dimethylmethoxysilylpropylacrylate is carried out by mixing both materials together, allowing the reaction to proceed at room temperature for 4 hours. Then the mixture is heated to 60° C for 8 hours. Fractionation produces the desired product.

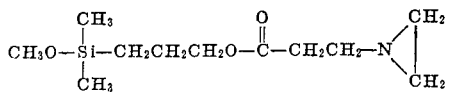

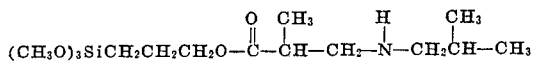

EXAMPLE 5

There is added equimolar amounts of β-cyanoethylamine to diethoxymethylsilylmethacrylate and the resulting mixture is heated for 8 hours at 100° C to produce the product of the structure,

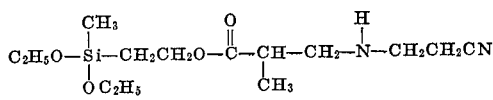

The structure is confirmed by both infrared and nuclear magnetic resonance.

We claim:

1. A silane of the formula,

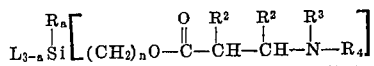

where L is selected from the group consisting of $R'_2N-$ and $R'O-$, R and $R^1$ are selected from the class consisting of monovalent hydrocarbon radicals and monovalent halogenated hydrocarbon radicals, $R^2$ is selected from the class consisting of alkyl and aryl radicals of up to 10 carbon atoms, $R^3$ and $R^4$ are independently selected from the class consisting of hydrogen, aryl radicals, alkyl radicals,

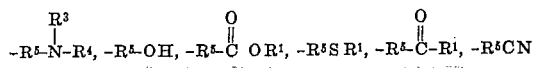

and $-R^5OR^1$, where $R^5$ is a divalent hydrocarbon radical selected from the class consisting of alkylene and arylene radicals of up to 10 carbon atoms, $n$ is a whole number that varies from 1 to 20 and $a$ is a whole number that varies from 0 to 2.

2. A compound of claim 1 wherein R, $R^1$ and $R^2$ are methyl and $n$ is equal to 3.

3. The compound of claim 1 wherein the compound has the formula,

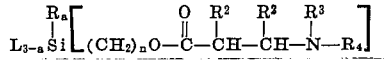

4. A method for producing a silane compound of the formula,

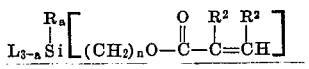

comprising reacting a compound of the formula,

with a compound of the formula, $$R^4-NH$$
  $$|$$
  $$R^3$$

where L is selected from the class consisting of $R'_2N-$ and $R'O-$, R and $R^1$ are selected from the class consisting of monovalent hydrocarbon radicals and monovalent halogenated hydrocarbon radicals, $R^2$ is selected from the class consisting of alkyl and aryl radicals of up to 10 carbon atoms, $R^3$ and $R^4$ are independently selected from the class consisting of hydrogen, aryl radicals, alkyl radicals,

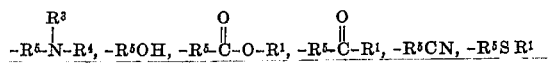

and $-R^5OR^1$, where $R^5$ is a divalent hydrocarbon radical selected from the class consisting of alkylene and arylene radicals of up to 10 carbon atoms, $n$ is a whole number that varies from 1 to 20 and $a$ is a whole number that varies from 0 to 2.

5. The method of claim 4 wherein the reaction is carried out at temperatures of 60° – 120° C.

6. The method of claim 4 wherein a basic catalyst is used.

7. The method of claim 6 wherein the basic catalyst is selected from the class consisting of sodium hydroxide, sodium methoxide, sodium ethoxide and potassium hydroxide.

* * * * *